3,037,875
PAINT COMPOSITIONS
Edward M. Geiser, Downers Grove, Ill., assignor to Universal Oil Products Company, Des Plaines, Ill., a corporation of Delaware
No Drawing. Filed Feb. 16, 1959, Ser. No. 793,289
14 Claims. (Cl. 106—253)

This invention relates to paint compositions and more particularly to improved paint compositions containing a novel additive to prevent settling out of pigments.

Paint formulations generally contain a pigment, a vehicle for the pigment and a drier. Upon standing, the pigment settles out of he mixture and is rather difficult to redisperse. Accordingly, any method of preventing such settling out of the pigment in paint formulations is of importance.

As hereinbefore set forth, paint compositions generally comprise a pigment, a vehicle for the pigment and a drier. The pigment may be either of the organic or inorganic type and is well known in the art. Illustrative pigments include red lead, red iron oxide, white lead, zinc oxide, titanium dioxide, zinc chromate, lithopone, carbon black, Prussian blue, etc. The vehicles for the pigments include the vegetable oils such as linseed oil, both bodied and raw, soybean, polyester type oils such as glycerine, erythritol or pentaerythritol esters of fatty acids or phthalic acid or their anhydrides. The driers include the naphthenates, oxides, resinates, oleates and acetates of cobalt, manganese, lead, zinc, etc. In some cases a pigment extender is used such as asbestine, talc, barytes, gypsum, clay, chalk, etc. Also, a pigment suspending agent can be employed, if desired, such as aluminum stearate.

The paint may be of the primer, enamel, glossy, semi-glossy or flat type. It may be used for covering any suitable surface, including metal, wood, brick, linoleum, plastic, etc.

In one embodiment the present invention relates to the method of preventing settling out of pigment in a paint composition containing the same, which comprises incorporating in the paint composition from about 0.01% to about 5% by weight of an additive selected from the group consisting of the condensation product of an epihalohydrin compound with an amine compound, salt and ester thereof.

In another embodiment, the present invention relates to a paint composition having incorporated therein from about 0.01% to about 5% by weight of an additive selected from the group consisting of the condensation product of an epihalohydrin compound with an amine compound, salt and ester thereof.

In one embodiment of the present invention, the additive comprises the condensation product of an epihalohydrin compound with an amine compound. The amine compound preferably contains at least twelve carbon atoms and generally will not exceed about forty carbon atoms per molecule. The alkyl amine is a primary or secondary amine, and reference to "alkyl amine" in the present specification and claims is intended to include primary alkyl amines, secondary alkyl amines, polyamines, N-alkyl polyamines, N,N'-dialkyl polyamines, etc. Preferred primary alkyl amines include dodecyl amine, tridecyl amine, tetradecyl amine, pentadecyl amine, hexadecyl amine, heptadecyl amine, octadecyl amine, nonadecyl amine, eicosyl amine, etc. Conveniently the long chain amines are prepared from fatty acids or more particularly from mixtures of fatty acids formed as products or by-products. Such mixtures are available commercially, generally at lower prices and, as another advantage of the present invention, the mixtures may be used without the necessity of separating individual amines in pure state.

An example of such a mixture is hydrogenated tallow amine which is available under various trade names including "Alamine H26D" and "Armeen HTD." These products comprise mixtures predominating in alkyl amines containing sixteen to eighteen carbon atoms per alkyl group, although they contain a small amount of alkyl groups having fourteen carbon atoms.

Illustrative examples of secondary amines include di-(dodecyl) amine, di-(tridecyl) amine, di-(tetradecyl) amine, di-(pentadecyl) amine, di-(hexadecyl) amine, di-(heptadecyl) amine, di-(octadecyl) amine, di-(nonadecyl) amine, di-(eicosyl) amine, etc. In another embodiment, which is not necessarily equivalent, the secondary amine will contain one alkyl group having at least twelve carbon atoms and another alkyl group having less than twelve carbon atoms. Illustrative examples of such compounds include N-propyl-dodecyl amine, N-butyl-dodecyl amine, N-amyl-dodecyl-amine, N-butyl-tridecyl amine, N-amyl-tridecyl amine, etc. Here again, mixtures of secondary amines are available commercially, usually at a lower price, and such mixtures may be used in accordance with the present invention. An example of such a mixture available commercially is "Armeen 2HT" which consists primarily of dioctadecyl amine and dihexadecyl amine.

Preferred examples of N-alkyl polyamines comprise N-alkyl-1,3-diaminopropanes in which the alkyl group contains at least twelve carbon atoms. Illustrative examples include N-dodecyl-1,3-diaminopropane, N-tridecyl-1,3-diaminopropane, N-tetradecyl-1,3-diaminopropane, N-pentadecyl-1,3-diaminopropane, N-hexadecyl-1,3-diaminopropane, N-heptadecyl-1,3-diaminopropane, N-octadecyl-1,3-diaminopropane, N-nonadecyl-1,3-diaminopropane, N-eicosyl-1,3-diaminopropane, etc. As before, mixtures are available commercially, usually at lower prices, of suitable compounds in this class and advantageously are used for the purposes of the present invention. One such mixture is "Duomeen T" which is N-tallow-1,3-diaminopropane and predominates in alkyl groups containing sixteen to eighteen carbon atoms each, although the mixture contains a small amount of alkyl groups containing fourteen carbon atoms each. Another mixture available commercially is N-coco-1,3-diaminopropane which contains alkyl groups predominating in twelve to fourteen carbon atoms each. Still another example is N-soya-1,3-diaminopropane which predominates in alkyl groups containing eighteen carbon atoms per group, although it contains a small amount of alkyl groups having sixteen carbon atoms.

While the N-alkyl-1,3-diaminopropanes are preferred compounds of this class, it is understood that suitable N-alkyl ethylene diamines, N-alkyl-1,3-diaminobutanes, N-alkyl-1,4-diaminobutanes, N-alkyl-1,3-diaminopentanes, N-alkyl-1,4-diaminopentanes, N-alkyl-1,5-diaminopentanes, N-alkyl-1,3-diaminohexanes, N-alkyl-1,4-diaminohexanes, N-alkyl-1,5-diaminohexanes, N-alkyl-1,6-diaminohexanes, etc. may be employed but not necessarily with equivalent results. Also, it is understood that polyamines containing three or more nitrogen atoms may be employed.

In general, the preferred amine compounds are saturated; i.e., do not contain double bonds in the chain. However, in some cases, unsaturated compounds may be employed and include such compounds as dodecylenic amine, didodecylenic amine, N-dodecylenic ethylene diamine, N-dodecylenic-1,3-diaminopropane, oleic amine, dioleic amine, N-oleic ethylene diamine, N-oleic-1,3-diaminopropane, linoleic amine, dilinoleic amine, N-linoleic ethylene diamine, N-linoleic-1,3-diaminopropane, etc. In another embodiment, two different amines may be reacted with the epihalohydrin compound.

As hereinbefore set forth, the amine compound is reacted with an epihalohydrin compound. Epichlorohydrin is preferred. Other epichlorohydrin compounds include 1,2-epi-4-chlorobutane, 2,3-epi-4-chlorobutane, 1,2-epi-5-chloropentane, 2,3-epi-5-chloropentane, etc. In general, the chloro derivatives are preferred, although it is understood that the corresponding bromo and iodo compounds may be employed. In some cases epidihalohydrin compounds may be utilized. It is understood that the different epihalohydrin compounds are not necessarily equivalent and that, as hereinbefore set forth, epichlorohydrin is preferred.

In a preferred embodiment, one mole of amine compound is reacted with one mole of epihalohydrin compound and the mixture further is reacted to form a polymeric product. In another embodiment, the amine compound or epihalohydrin compound is reacted in a molecular excess which generally will not exceed a mole ratio of 3:1.

The condensation is effected in any suitable manner. In a preferred embodiment, one of the reactants is added gradually to a stirred solution of the other reactant, and the mixture is thoroughly admixed to obtain intimate reaction. Generally, it is preferred to use a solvent, either during the reaction or in preparing solutions of one or both of the reactants prior to mixing. A particularly suitable solvent comprises an alcohol including ethanol, propanol, butanol, etc. The reaction is effected at any suitable temperature which generally will range from about 20° to about 100° C. and preferably from about 50° to about 90° C.

Either before or after removal of the condensation product from the reaction zone, the product is treated to remove halogen, generally in the form of an inorganic halide salt as, for example, the sodium halide salt. This may be effected in any suitable manner and generally is accomplished by reacting the product with a strong inorganic base such as sodium hydroxide, potassium hydroxide, etc., to form the corresponding metal halide. The reaction to form the metal halide generally is effected under the same conditions as hereinbefore set forth. After this reaction is completed, the metal halide is removed in any suitable manner, including filtration, centrifugal separation, etc. It is understood that the reaction product also is heated sufficiently to remove water and solvent, when employed, and this may be effected either before or after the treatment to remove the inorganic halide.

In another embodiment of the present invention, an alkyl phosphate salt of the condensation product is utilized and includes either the alkyl acid orthophosphate or the alkyl acid pyrophosphate. The alkyl acid orthophosphate may comprise a monoalkyl ester, dialkyl ester or a mixture thereof. Generally, at least one alkyl group constituting the ester contains at least five carbon atoms. Preferred alkyl acid orthophosphates include monoamyl acid orthophosphate, diamyl acid orthophosphate, mixture of mono- and diamyl acid orthophosphates, monohexyl acid orthophosphate, dihexyl acid orthophosphate, mixture of mono- and dihexyl acid orthophosphates, monoheptyl acid orthophosphate, diheptyl acid orthophosphate, mixture of mono- and diheptyl acid orthophosphates, monooctyl acid orthophosphate, dioctyl acid orthophosphate, mixture of mono- and dioctyl acid orthophosphates, mononoyl acid orthophosphate, dinonyl acid orthophosphate, mixture of mono- and dinonyl acid orthophosphates, monodecyl acid orthophosphate, didecyl acid orthophosphate, mixture of mono- and didecyl acid orthophosphates, etc.

Conveniently, alkyl groups containing more than eight carbon atoms are introduced through the use of fatty alcohols and thus the alkyl radical may be selected from capryl, lauryl, myristyl, palmityl, stearyl, ceryl, etc. Illustrative phosphates in this class include stearyl capryl acid orthophosphate, distearyl acid orthophosphate, dicapryl acid orthophosphate, etc. In other examples, one of the alkyl groups contain less than eight carbon atoms while the second alkyl group contains more than eight carbon atoms and such examples are illustrated by ethyl lauryl acid orthophosphate, ethyl stearyl acid orthophosphate, hexyl lauryl acid orthophosphate, hexyl capryl acid orthophosphate, hexyl stearyl acid orthophosphate, etc.

Alkyl acid phosphates, including both the ortho and pyrophosphates, also are manufactured commercially as a mixture of mono- and dialkyl acid phosphates and are available at lower costs. In many cases, such mixtures are suitable for use in preparing the salt of the present invention and such use, therefore, is preferred for economic reasons.

The alkyl acid phosphate salt of the condensation product is prepared utilizing at least one mole of alkyl acid phosphate per mole of condensation product and will range up to one mole of phosphate per each mole equivalent of basic nitrogen in the condensation product. In general this will comprise from about two to about twenty moles of phosphate per mole of condensation product.

The salt is prepared in any suitable manner and, in general, by mixing the alkyl acid phosphate and the condensation product at ambient temperature, preferably with vigorous stirring. The reaction proceeds readily at room temperature, although a slightly elevated temperature, which generally will not exceed about 80° C., may be employed when desired. Excessive temperatures must not be used in order to avoid decomposition reactions. Because the reaction is slightly exothermic, in some cases it may be desirable to cool the reaction vessel. The reaction may be effected in the presence or absence of a solvent. When employed, the solvent may be used in forming a more fluid mixture of the reactants before mixing and/or during the mixing thereof. Any suitable solvent may be employed and preferably is an aromatic hydrocarbon including benzene, toluene, xylene, ethylbenzene, cumene, etc., or mixtures thereof. In other cases the solvent may be selected from alcohols, ethers, ketones, etc. In many cases it is desired to market the salt as a solution in a suitable solvent, and conveniently the same solvent is used during manufacture of the salt as is desired in the final product.

In another embodiment the salt is a carboxylic acid salt of the condensation product. Any suitable carboxylic acid may be used in forming the salt and, in one embodiment, comprises a monobasic carboxylic acid containing at least six carbon atoms, more particularly from six to about twenty-five carbon atoms, and thus includes caproic, caprylic, lauric, myristic, palmitic, stearic, arachidic, behenic, lignoceric, cerotic, etc., decylenic, dodecylenic, palmitoleic, oleic, ricinoleic, petroselinic, vaccenic, linoleic, linolenic, eleostearic, licanic, parinaric, gadoleic, arachidonic, cetoleic, eurcic, selacholeic, etc. However, in some cases, lower monobasic carboxylic acids may be employed and thus include formic, acetic, propionic, butyric, valeric, trimethylacetic, etc.

In another embodiment a polycarboxylic acid is used in forming the salt and preferably comprises a dibasic carboxylic acid containing at least six and preferably at least ten carbon atoms per molecule and more particularly from about twenty to about fifty carbon atoms per molecule. The preferred acids are referred to herein as high molecular weight polybasic carboxylic acids and include adipic, pimelic, suberic, azelaic, sebacic, phthalic, etc., aconitic, citric, etc., hemimellitic, trimesic, prehnitic, mellophanic, pyromellitic, mellitic, etc., and higher molecular polybasic carboxylic acids. It is understood that a mixture of acids may be employed. A number of mixed by-product acids are available commercially such as "VR-1 Acid," "Empol 1022," etc. These mixed acids comprise primarily dilinoleic acid.

The carboxylic acid salt of the condensation product is prepared in any suitable manner. In general, this salt is prepared under substantially the same conditions as heretofore described in connection with the preparation of the alkyl acid phosphate salt.

In still another embodiment of the presetn invention, the additive comprises an ester of the condensation product. In preparing the ester, a carboxylic acid as hereinbefore set forth may be employed, but the reaction in forming the ester is conducted at a higher temperature in order to effect the esterification and the accompanying liberation of water. In general, the reaction is effected at a temperature of from about 80° to about 180° C.

Regardless of which additive is employed, it will be used in a concentration of from about 0.01% to about 5% by weight of the paint composition and preferably from about 0.1% to about 3% by weight thereof, although in some cases a lower concentration, say down to 0.001% by weight, may be used. The additive may be incorporated in the paint composition in any suitable manner. When desired, the additive may be incorporated in the vehicle and/or solvent, the pigment then added, and the mixture ground in the usual manner on a roller mill or a pebble mill. After grinding, an additional quantity of vehicle may be added along with a drier and solvent as desired. When using certain pigments it is unnecessary to subject the mixture to grinding and, in such cases, the additive is incorporated into the vehicle portion of the paint paste, either before or after thinning.

The following examples are introduced to illustrate further the novelty and utility of the present invention but not with the intention of unduly limiting the same.

EXAMPLE I

A typical lead oxide paint formulation was prepared as follows:

Table I

| Ingredient: | Parts by weight |
|---|---|
| Red lead | 300 |
| Raw linseed oil | 48 |
| Bodied linseed oil | 52 |
| Aluminum stearate | 1 |
| Solvent (xylene) | 90 |

The above formulation was prepared in the laboratory, with the ingredients being mixed by mechanical stirring. The pigment separated readily on standing and was redispersed only with considerable difficulty. Substantial separation of pigment occurred in three to four hours.

EXAMPLE II

Another formulation as described in Example I was prepared in the laboratory except that 2% by weight of the condensation product of equal mole proportions of hydrogenated tallow amine and epichlorohydrin were incorporated in the vehicle prior to mechanical stirring.

The formulation containing the additive showed no settling out of pigment for three hours. Only 20–25% of separation occurred after sixty-five hours.

It will be noted the formulations of Examples I and II were prepared using heavy and most difficult pigments to disperse. This was done intentionally for two reasons: (1) these pigments present the greatest problem and (2) if these are improved, then the lighter pigments also will be improved. Furthermore, the ingredients were prepared in the laboratory using mechanical stirring and even further improvement will be obtained in larger scale preparations using conventional milling procedures.

It is readily apparent that the additive served to prevent settling of pigment and thereby will permit satisfactory reuse of the pain formulation after an interval of one or two days. In other words, after the paint formulation has been suitably mixed, it is used and, when the painting is not finished or is to be used on a different job, the paint formulation may be reused the next day without the necessity of extensive mixing to obtain redispersing of the pigment. The practice of extending a painting job over two days is quite common and, in such cases, it is apparent that the additive of the present invention serves an important function of maintaining the paint formulation in a condition which is readily useable. However, as mentioned above, even greater shelf life is obtained in larger scale preparations using conventional milling equipment.

EXAMPLE III

A lead oxide formulation is prepared to contain the following ingredients.

Table II

| Ingredient: | Parts by weight |
|---|---|
| Red lead | 100 |
| Raw linseed oil | 15 |
| Bodied linseed oil | 18 |
| Aluminum stearate | 0.4 |
| Solvent (mineral spirits) | 30 |
| 6% manganese (as manganese naphthenate) | 1 |
| 24% lead (as lead naphthenate) | 2 |

1.5% by weight of the mixed mono- and dioctyl acid orthophosphate salts of the condensation product of hydrogenated tallow amine and epichlorohydrin is incorporated in the paint formulation. This serves to prevent settling out of pigment and permits the ready reuse of the paint formulation.

EXAMPLE IV

The additive used in this example is the dilinoleic acid salt of the condensation product of ditridecyl amine and epichlorohydrin. This additive is incorporated in a concentration of 2% by weight in a paint formulation similar to that described in Examples I and III and serves to prevent settling out of pigment in the paint formulation.

EXAMPLE V

The additive of this example is the stearic acid ester of the condensation product of N-tallow-1,3-diaminopropane and epichlorohydrin. The ester is incorporated in a concentration of 3% by weight in a paint formulation similar to that described in Examples I and III and serves to prevent settling out of pigment in the paint formulation.

I claim as my invention:

1. The method of preventing settling of pigment in a paint composition containing the same, which comprises incorporating in said composition from about 0.01% to about 5% by weight of an additive selected from the group consisting of the condensation product of an epihalohydrin compound with an amine compound in equimolar proportions and salts and esters of said condensation product.

2. The method of claim 1 further characterized in that said additive is the condensation product of epichlorohydrin with an amine compound having from about twelve to about forty carbon atoms per molecule.

3. The method of claim 1 further characterized in that said additive comprises the condensation product of epichlorohydrin and tallow amine.

4. The method of claim 1 further characterized in that said additive is an alkyl acid phosphate salt of said condensation product.

5. The method of claim 4 further characterized in that said alkyl acid phosphate comprises mixed mono- and diisoamyl acid orthophosphates.

6. The method of claim 4 further characterized in that said alkyl acid phosphate comprises mixed mono- and dioctyl acid orthophosphates.

7. The method of claim 1 further characterized in that said additive is a dicarboxylic acid ester of said condensation product.

8. A paint composition having incorporated therein from about 0.01% to about 5% by weight of an additive selected from the group consisting of the condensation product of an epihalohydrin compound with an amine compound in equimolar proportions and salts and esters of said condensation product.

9. The composition of claim 8 further characterized in that said additive is the condensation product of an epichlorohydrin with an amine compound having from about twelve to about forty carbon atoms per molecule.

10. The composition of claim 8 further characterized in that said additive comprises the condensation product of epichlorohydrin and tallow amine.

11. The composition of claim 8 further characterized in that said additive is an alkyl acid phosphate salt of said condensation product.

12. The composition of claim 11 further characterized in that said alkyl acid phosphate comprises mixed mono- and diisoamyl acid orthophosphates.

13. The composition of claim 11 further characterized in that said alkyl acid phosphate comprises mixed mono- and dioctyl acid orthophosphates.

14. The composition of claim 8 further characterized in that said additive is a dicarboxylic acid ester of said condensation product.

References Cited in the file of this patent

UNITED STATES PATENTS

| | | |
|---|---|---|
| 1,922,459 | Schmidt et al. | Aug. 15, 1933 |
| 1,970,578 | Schoeller et al. | Aug. 21, 1934 |
| 2,150,060 | Koermann et al. | Mar. 7, 1939 |
| 2,192,955 | Sloan et al. | Mar. 12, 1940 |
| 2,267,240 | Kummel | Dec. 23, 1941 |
| 2,344,130 | Covert | Mar. 14, 1944 |
| 2,403,423 | Zurcher | July 2, 1946 |
| 2,427,082 | Zurcher | Sept. 9, 1947 |
| 2,478,859 | Carnes et al. | Aug. 9, 1949 |
| 2,717,214 | Marotta et al. | Sept. 6, 1955 |
| 2,878,135 | Willis | Mar. 17, 1959 |